Figure 1:
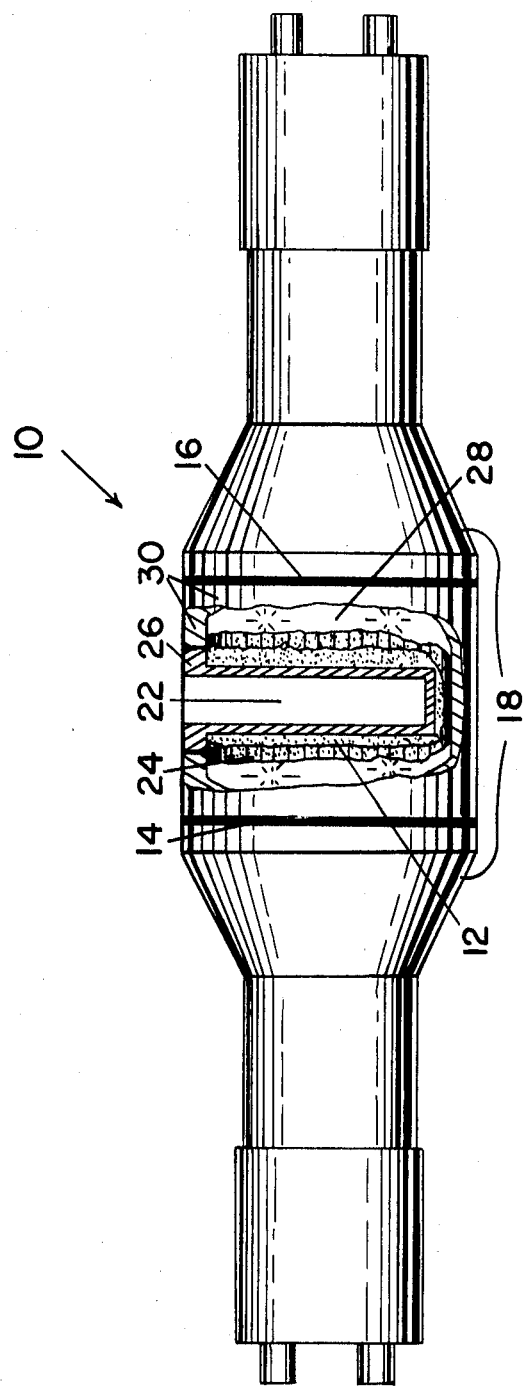

United States Patent

[11] 3,591,807

[72] Inventors Charles W. Mays
 Salt Lake City;
 Ray D. Lloyd, Murray; David R. Atherton, Salt Lake City, all of, Utah
[21] Appl. No. 577,441
[22] Filed Sept. 6, 1966
[45] Patented July 6, 1971
[73] Assignee Granted to United States Atomic Energy Commission under the provisions of 42 U.S.C. 2182

[54] PHOTON DETECTOR UTILIZING A WELL-TYPE SCINTILLATION CRYSTAL
 2 Claims, 2 Drawing Figs.
[52] U.S. Cl. .......................................................... 250/71.5 R
[51] Int. Cl. ........................................................... G01t 1/20
[50] Field of Search ............................................. 250/71.5, 106 SC

[56] References Cited
UNITED STATES PATENTS

| | | | |
|---|---|---|---|
| 3,270,202 | 8/1966 | Long et al. | 250/71.5 |
| 3,141,977 | 7/1964 | Fratantuno | 250/106 |
| 3,090,866 | 5/1963 | Brannon, Jr. | 250/71.5 |
| 2,924,718 | 2/1960 | Packard et al. | 250/71.5 |
| 3,422,268 | 1/1969 | Meining | 250/106 |

Primary Examiner—Ralph G. Nilson
Assistant Examiner—D. L. Willis
Attorney—Roland A. Anderson ABSTRACT: A novel phonton detector, the preferred embodiment comprising a scintillating crystal having a uniquely oriented counting chamber disposed transversely within the scintillating crystal, the crystal having a plurality of planar faces uniformly spaced from the counting chamber to accommodate a plurality of photomultiplier tubes. The mentioned novel phonton detector has unexpected and surprising capability of achieving uniform counting rate independent of sample position or sample volume and shape.

INVENTORS
CHARLES W. MAYS
RAY D. LLOYD
DAVID R. ATHERTON
BY Lynn G. Foster
ATTORNEY INVENTORS
CHARLES W. MAYS
RAY D. LLOYD
DAVID R. ATHERTON
BY Lynn G. Foster
ATTORNEY

PHOTON DETECTOR UTILIZING A WELL-TYPE SCINTILLATION CRYSTAL

This invention pertains to the measurement of relative activities of various samples which emit high energy rays, such as gamma rays, X-rays, or other ionizing photon radiation as a product of natural radioactive decay. Such measurement is achieved by inserting the sample into a novel counting chamber and recording the relative number and energies of rays detected.

It is known to use a cylindrically shaped scintillator with a counting chamber bored axially into one planar surface to measure gamma rays and the like. One or more photomultiplier tubes are situated on a planar surface opposite the bore and with the face of each phototube being perpendicular to the axis of the well; the photomultiplier tube or tubes usually being separated from the scintillator by a window of quartz or other optical material. Radiation is emitted isotropically from the sample and travels into the scintillator. Each interaction of a photon with the scintillator causes it to produce a flash of light proportional in magnitude to the amount of energy absorbed. These light pulses travel to the photosensitive surface of the photomultiplier tube where they are transformed into electrical pulses proportional in amplitude to the magnitude of the light flash. These electrical pulses can the be recorded electronically.

Historically, the prior art has evidenced significant disadvantages in the extensive care which must be taken to insure that successive samples are nearly identical in volume and shape to permit a meaningful comparison of data. It is also well known in the art that the position in the counting chamber of successive samples normally must be carefully duplicated, because even minor positional differences change the recorded count rate.

In view of the foregoing, it would be a significant and worthwhile contribution to the high energy ray detection art to provide a system which could (a) detect and record ionizing photon radiation, with a minimum of light loss between the point of light production in the scintillator and the photomultiplier, (b) maintain a consistent, precise count rate irrespective of the volume or shape of successive samples and (c) maintain a consistent, accurate counting rate irrespective of the specific location of said samples within the counting chamber. The present invention provides these advantages.

In the preferred embodiment of this invention a scintillator, preferably cylindrically shaped, has a transversely extending counting chamber, which is radially bored through the central axis of the scintillator. In this preferred arrangement, two photomultiplier tubes with optical surfaces having generally the same surface area as the adjacent planar end of the scintillator are disposed one each at the planar end surfaces of the cylindrical scintillator. Thus, the counting chamber is disposed transverse to the viewing axis of the photomultiplier tubes resulting in decreased light loss since a greater fraction of the scintillator surface is covered by photomultiplier tubes. Although optical windows could be used, preferably each photomultiplier tube is optically coupled directly to the opposing surfaces of the scintillator thereby obviating the need for optical windows and reducing the number of reflecting events required for the light to reach a photo sensitive surface.

The implementation of this invention under test conditions has produced surprising results. Contrary to the performance of the prior art, a relatively uniform counting rate has been produced regardless of the position of the sample within the transverse counting chamber.

Figure 2:
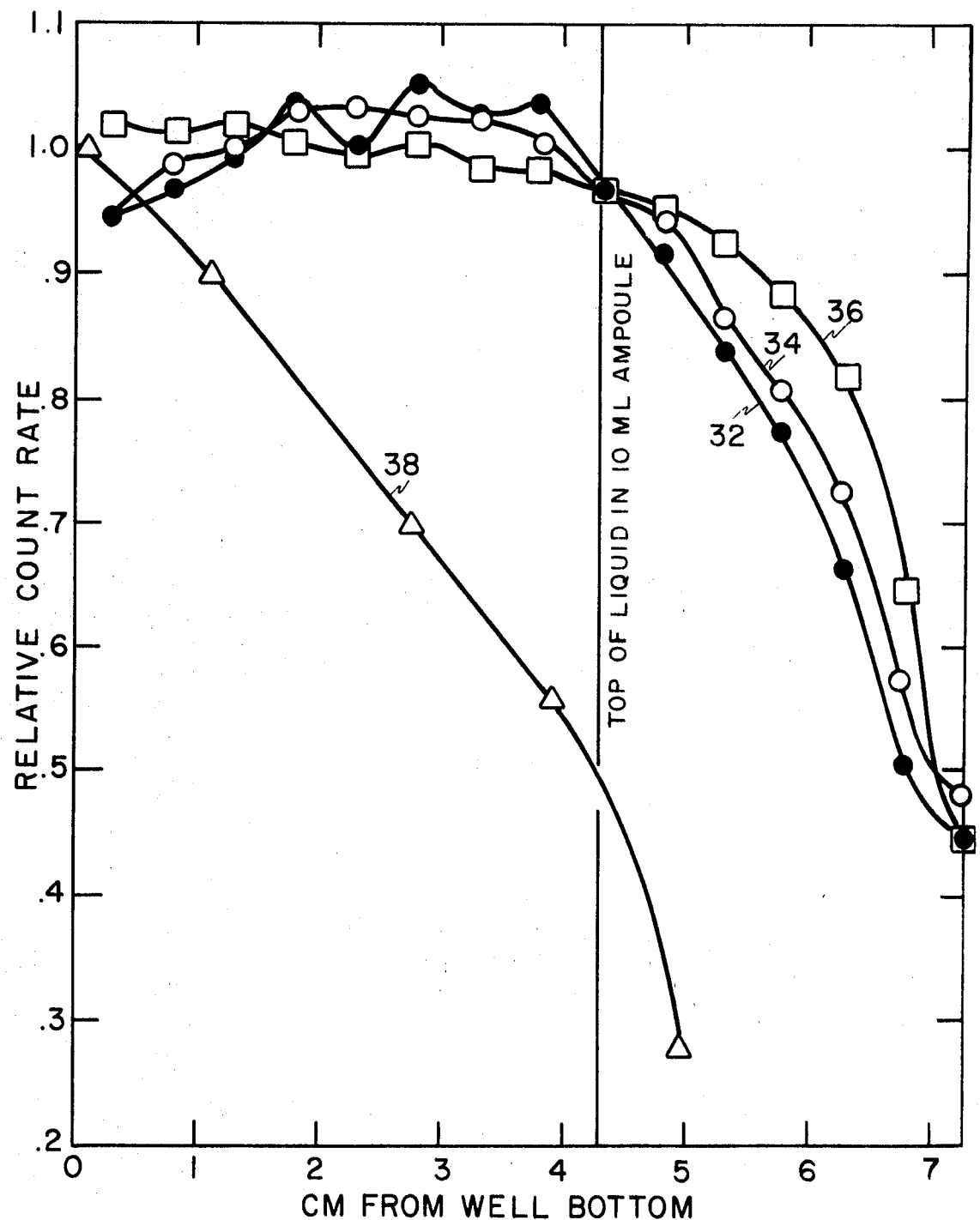

As illustrated by the graphic representations of FIG. 2, it was discovered that the general orientation of the counting chamber in a transverse direction and use of at least two phototube detectors are key factors in maintaining a consistent relative count rate, regardless of sample position. The representations of FIG. 2 will be discussed in greater detail later in this specification.

Similarly, using the present invention, deviations in volumes or shapes or succeeding samples do not significantly affect the relative count rate, as shown by the following table, which illustrates the relative count rates, in counts per minute (c.p.m.) per microcurie ($\mu$Ci) of (5) milliliter and (10) milliliter ampuls.

TABLE 1.—RELATIVE COUNTING RATES IN FIVE AND TEN MILLILITER AMPOULES*

| Nuclide | Photon energy, kev | c.p.m./$\mu$Ci in 5 ml. ampoule/ c.p.m./$\mu$Ci in 10 ml. ampoule |
|---|---|---|
| $^{57}$Co | 136 | 1.008 |
| $^{95}$Zr + $^{95}$Nb | 750 | 0.992 |
| $^{205}$Tl | 2,620 | 0.996 |
| Average | | 0.999 |

*The liquid column in a 5 ml. ampoule was about 1.5 cm. in diameter and 3.2 cm. high, while the liquid column in a 10 ml. ampoule was about 1.9 cm. in diameter and 4 cm. high.

In view of the results illustrated in Table 1, it is apparent that the relative count rate as determined by the presently preferred embodiment of this invention is substantially independent of the volume or shape of the sample.

It is not yet fully understood why the transverse orientation of the counting chamber has such a significant and profound effect upon the uniformity of the relative count rates regardless of sample configuration, size or position, but the surprising improvement achieved through such orientation has been demonstrated in the laboratory. It is presently believed that the most significant feature responsible for the improved results achieved by use of this invention is the similar distance from where most of the scintillations take place to the photo tube surface.

Accordingly, it is a primary object of this invention to provide a novel apparatus and method for detecting ionizing photon radiation wherein a relatively uniform counting rate is achieved independent of the position of the sample within the counting chamber.

Another important object of this invention is the provision of a novel apparatus and method for creating a relatively uniform counting rate independent of the respective volume and shape of each successive sample counted in the counting chamber.

A further valuable object is the provision of a novel high energy detector for achieving a high counting efficiency, particularly resulting in good resolution of gamma ray energies.

Other features and objects of this invention will become more fully apparent from the following description and appended claims taken in conjunction with the accompanying drawings wherein:

FIG. 1 is a schematic illustration of a presently preferred embodiment of the present invention using a scintillator with two photomultiplier tubes attached; and FIG. 2 is a graphical comparison of data as to comparative count rates and sample position accumulated (a) through use of the presently preferred embodiment of this invention and (b) through use of a generally accepted prior art device.

Referring to the drawings, FIG. 1 schematically depicts one preferred high energy ray detector, generally designated 10, having a scintillator 12, which is preferably a single thallium-activated sodium iodide crystal in the shape of a cylinder. The cylindrical surfaces of the scintillator 12 is enveloped in a suitable reflecting material 28, such as magnesium oxide, which is covered with a protective sleeve 30 thereby preventing light and water from reaching the crystal, said sleeve being fabricated from a suitable material such as stainless steel. The crystal 12 achieves high efficiency and good resolution because it is a scintillator having a relatively large volume, fabricated from a material having high atomic number. At the same time, the present invention accommodates production of a comparatively small detector having low background. One presently preferred scintillator which represents a suitable compromise in volume achieving the maximum advantages and minimum limitations evidenced in the above-described detector has a diameter on the order of about 8.9 cm. and a length on the order of about 7.6 cm.

A counting chamber 22 is radially bored or otherwise excavated in the cylindrical surface 24 of the scintillator 12 through the central axis and perpendicular to it such that the counting chamber 22 is generally equidistant from the planar ends 14 and 16. The counting chamber 22 is lined with an aluminum or other protective liner 26 which accommodates passage of ionizing photon radiation therethrough while at the same time isolates the crystal from outside light and atmospheric moisture in conjunction with the stainless steel sleeve 30.

The detector 10 further comprises two magnetically shielded photomultiplier tubes 18 respectively optically coupled to each of the opposing planar surfaces 14, 16 of the scintillator 12. These photomultiplier tubes may be any suitable commercially available device. For example, the RCA Model 8054 photomultiplier may be used.

FIG. 2 represents a graph illustrating some of the surprising results obtained from the invention as embodied in FIG. 1.

Reference is now made to FIG. 2 which graphically depicts the superior detection results obtained using the present invention when compared with results obtained using a prior art gamma ray detector of well-known type having a diameter on the order of about 5.0 cm. and an outside length on the order of about 6.3 cm. Specifically, plots of relative counting rates vs. distance from the bottom of the counting chamber in centimeters are depicted in FIG. 2 as detected by the present invention wherein plot 32 is $^{57}Co$ at an energy of 0.136 Mev. (Million-electron volts), plot 34 is $^{95}Zr+^{95}Nb$ at 0.75 Mev., and plot 36 is $^{214}Bi$ at 1.76 Mev. Line 38 is the response from 0.25 to 1.00 Mev. of equal activities of $^{214}Pb$ and $^{214}Bi$ detected by the mentioned prior art device.

As can be appreciated by examination of FIG. 2, the relative count rate of the sample detected by the prior art device was substantially affected by relatively minor changes in the position of the sample within the counting chamber. Conversely, however, the count rate of samples detected by the presently preferred embodiment of this invention surprisingly evidences a high degree of uniformity no matter where the sample is placed within the counting chamber and irrespective of the magnitude of photon energies within the tested samples.

In operation, a radioactive sample is inserted into the counting chamber 22 of the detector 10. The relative location of the sample within the chamber is relatively important. Ionizing photon radiation is emitted from the sample in all directions into the scintillator 12, and many of these photons are absorbed by the scintillator resulting in momentary illuminations which are detected by the photomultiplier tubes 18 for recording. The photomultiplier tubes 18 thereafter transmit the mentioned illuminations as electrical impulses through conventional adder and discrimination circuits to a recording device.

In view of the foregoing, it should be appreciated that the new concept in the structure and operation of photon detectors as embodied in the present invention has substantially eliminated persisting problems in the art by providing uniform counting rates irrespective of (a) the relative position of the sample within the counting chamber and (b) the size and shape of the sample, and further providing a somewhat higher counting efficiency than normally achieved by the prior art.

The invention may be embodied in other specific forms without departing from the spirit or essential characteristics thereof. The present embodiment is, therefore, to be considered in all respects as illustrative and not restrictive. The scope of the invention being indicated by the appended claims rather than by the foregoing description, and all changes which come within the meaning and range of equivalency of the claims are therefore to be embraced therein.

What We therefore claim and desired to be secured by United States Letters Patent is:

1. In a method of determining the relative activities of substances exhibiting radioactive decay, the steps of:

providing a cylindrical crystalline scintillator having a counting chamber radially bored therein perpendicular to the axis of the cylinder; mounting a photodetector in surface-to-surface coaxial relation upon each planar face of the detector;

inserting a sample of said radioactive substance of desired shape and size into the counting chamber of the scintillator, the counting chamber having sidewalls and bottom formed of the scintillator;

stationing said sample at any location within the counting chamber and insuring that the sample, scintillator and at least one photodetector are separated a uniform distance along the viewing axis of the photodetector;

detecting from at least two viewpoints scintillations which are developed by radiation passing through the sides and bottom of the counting chamber so that the scintillations are more accurately proportional to the actual number of rays emitted by the sample;

recording the number of the detected rays.

2. An apparatus for detecting radiation comprising:

a cylindrically shaped crystalline scintillator having opposed planar ends;

an external shield circumscribing the curved periphery of the cylindrical scintillator;

a blind bore radially inwardly disposed in the cylindrical scintillator, the axis of the bore being disposed normal to and intersecting the axis of the cylindrical scintillator essentially midway between the planar ends thereof, the bore opening at the curved periphery of the scintillator and terminating substantially within the scintillator;

a protective liner covering the exposed surfaces of the blind bore; and a photo detector mounted juxtaposed each planar end of the cylindrical scintillator so as to be coaxial therewith, the photosensitive face of each photodetector having essentially the same diametral dimension as the respective planar ends.